United States Patent [19]
Chilton et al.

[11] Patent Number: 5,716,522
[45] Date of Patent: Feb. 10, 1998

[54] NON-WOVEN DEPTH MEDIA IN-TANK FUEL FILTER

[75] Inventors: Hugh G. Chilton, Findlay, Ohio; John F. Combest, Fearrington Village, N.C.

[73] Assignee: Kuss Corporation, Findlay, Ohio

[21] Appl. No.: 738,007

[22] Filed: Oct. 25, 1996

[51] Int. Cl.$^6$ ............................................. B01D 35/027
[52] U.S. Cl. ........................... 210/317; 210/461; 210/486; 210/491; 210/496; 210/505; 428/292.1; 428/311.11
[58] Field of Search ............................. 210/314, 317, 210/335, 461, 486, 489, 491, 496, 505; 55/486, 487, 489; 428/292.1, 311.11

[56] References Cited

U.S. PATENT DOCUMENTS

| | | | |
|---|---|---|---|
| 2,911,101 | 11/1959 | Robinson | 210/458 |
| 3,826,372 | 7/1974 | Bell | 210/172 |
| 4,036,758 | 7/1977 | Combest | 210/223 |
| 4,604,203 | 8/1986 | Kyle | 210/489 |
| 4,645,600 | 2/1987 | Filippi | 210/416.4 |
| 4,663,222 | 5/1987 | Ohue et al. | 428/224 |
| 4,853,123 | 8/1989 | Hayes et al. | 210/316 |
| 4,961,850 | 10/1990 | Combest | 210/232 |
| 5,283,106 | 2/1994 | Seiler et al. | 428/198 |
| 5,294,482 | 3/1994 | Gessner | 428/287 |
| 5,509,950 | 4/1996 | Van De Graaf et al. | 55/486 |
| 5,547,568 | 8/1996 | Sasaki | 210/172 |
| 5,620,785 | 4/1997 | Watt et al. | 428/311.11 |

*Primary Examiner*—Matthew O. Savage
*Attorney, Agent, or Firm*—Brinks Hofer Gilson & Lione

[57] ABSTRACT

An in-tank fuel filter includes a body comprising layers of spun bonded and melt blown filtration media and a fitting for mounting the filter to an in-tank fuel pump inlet. An outer layer of the body is preferably spun bonded material which exhibits good abrasion resistance. One or more inner layers of melt blown filtration media define smaller pore sizes and thus exhibit smaller particle filtration capability. The mounting fitting is made of a fuel compatible material and may either be a multiple part device or be in-situ molded on the filter body. A separator may be disposed in the interior of the filter to prevent its collapse and improve fuel withdrawal through the mounting fitting.

21 Claims, 2 Drawing Sheets

NON-WOVEN DEPTH MEDIA IN-TANK FUEL FILTER

BACKGROUND OF THE INVENTION

The invention relates generally to in-tank fuel filters and more specifically to an in-tank fuel filter having layers of non-woven material comprising both spun bonded and melt blown filtration media.

The modular assembly approach to motor vehicle manufacture increasingly demanded and practiced by automobile manufacturers has effected the design and componentry of motor vehicles in numerous ways. With regard to fuel systems, and particularly the fuel supply and filtration components, fuel filters have changed from a single, in-line assembly typically disposed under the hood and adjacent the carburetor, such as disclosed in U.S. Pat. No. 4,036,758, to modular designs wherein a filter, fuel pump and level sensor comprise an assembly which is disposed within and secured to the fuel tank. Such an in-tank filter is described in U.S. Pat. No. 4,961,850.

Typically, such in-tank filters comprise at least a single layer of a woven nylon, polyester or acetal fabric which is sealed by heat, radio frequency or ultrasonic energy along its edges. In order to improve small particulate filtration capability, the exterior woven fabric layer may be supplemented by an interior non-woven layer having significantly finer pores which provide improved small particulate filtration capability. Given the comparative pore sizes of the outer and inner layers and the particulate filtration capability required of such filters, the exterior layer, in fact, provides little from the standpoint of filtration. Rather, it is present primarily to provide a suitably durable protective covering for the non-woven interior layers. Such protection is also necessary because such in-tank filters are disposed either on the end of a suction tube or directly at the inlet of an in-tank fuel pump. In order to achieve the maximum withdrawal of fuel from the tank, the filter is positioned, and in some installations pressed, against the bottom surface of the fuel tank. In this condition, the lower surface of the fuel filter is subjected to abrasive action due to the small though inevitable relative movement between the filter and the bottom surface of the fuel tank.

The present invention achieves the small particulate filtration capability of melt blown materials and exhibits excellent abrasion resistance while reducing the expense and assembly steps associated with the use of a woven fabric outer layer.

SUMMARY OF THE INVENTION

An in-tank fuel filter includes a body comprising layers of spun bonded and melt blown filtration media and a fitting for mounting the filter to an in-tank fuel pump inlet. An outer layer of the body is preferably spun bonded nylon material which exhibits good abrasion resistance. One or more inner layers of melt blown filtration media define smaller pore sizes and thus exhibit smaller particle filtration capability. The spun bonded material acts as a relatively coarse filter of particulates and the one or more layers of melt blown material filter finer particulates thereby providing graduated or staged, i.e., depth media, filtration. The mounting fitting is made of a fuel compatible material and may either be a multiple part device or be in-situ molded on the filter body. One or more separators or a stuffer may be disposed in the interior of the filter to prevent its collapse and improve fuel withdrawal through the mounting fitting.

It is thus the object of the present invention to provide an in-tank fuel filter constructed of non-woven filtration media.

It is a further object of the present invention to provide an in-tank fuel filter having a plurality of non-woven layers of filtration media.

It is a still further object of the present invention to provide an in-tank fuel filter having an outer layer of spun bonded filtration media and one or more inner layers of melt blown filtration media.

It is a still further object of the present invention to provide an in-tank fuel filter which exhibits excellent abrasion resistance when situated in contact with the bottom of a fuel tank.

It is a still further object of the present invention to provide an in-tank fuel filter having a plurality of non-woven layers of filtration media with the layers arranged to provide staged or graduated filtration.

It is a still further object of the present invention to provide an in-tank fuel filter having a multi-part or in-situ molded fitting and a spacer or stuffer assembled therewith.

Further objects and advantages of the present invention will become apparent by reference to the following description of the preferred and alternate embodiments and appended drawings wherein like reference numbers refer to the same feature, element or component.

DESCRIPTION OF THE PREFERRED EMBODIMENT

Figure 1:
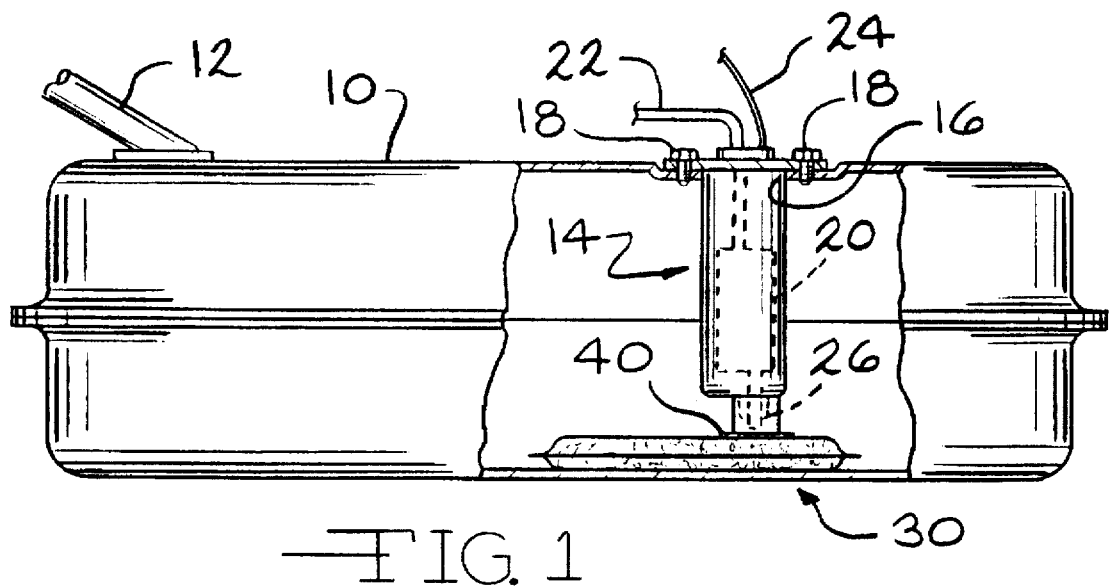
FIG. 1 is a diagrammatic, side elevational view, with portions broken away, of a fuel tank including an in-tank fuel filter according to the present invention.

Referring now to FIG. 1, a typical vehicle fuel tank is illustrated and generally designated by the reference numeral 10. The vehicle fuel tank 10 is typically fabricated of formed, welded metal, blow molded plastic or a similar substantially rigid and fuel resistant material. The vehicle fuel tank 10 includes an inlet or filler tube 12 which receives fuel such as gasoline, gasohol, diesel fuel or other, alternative fuel from a source exterior to the vehicle (not illustrated) and directs it to the interior of the vehicle fuel tank 10 as will be readily understood.

The vehicle fuel tank 10 also typically includes an electric fuel pump module 14 which is sealingly mounted within an opening 16 in the vehicle fuel tank 10 and may be secured thereto by a plurality of threaded fasteners 18 or other securement means. The electric fuel pump module 14 preferably includes an electric fuel pump 20 and may include a fuel level sensor assembly (not illustrated). The fuel pump 20 provides fuel under pressure to a fuel outlet or supply line 22. An electrical cable 24 having one or two conductors provides electrical energy to the fuel pump 20 in accordance with conventional practice.

Figure 2:
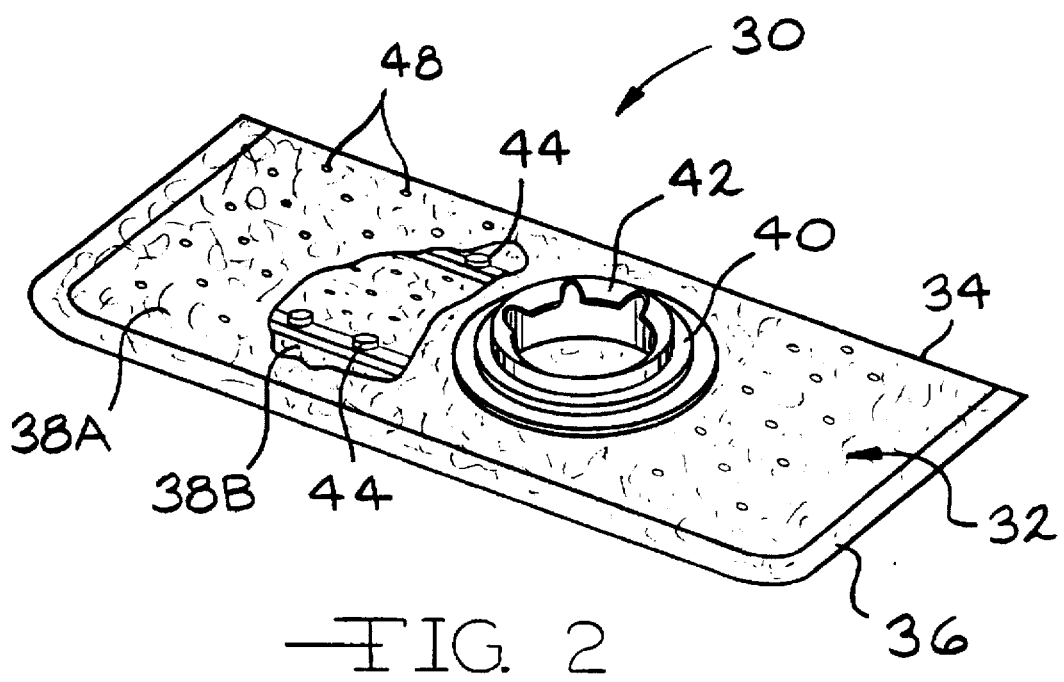
FIG. 2 is a perspective view of an in-tank fuel filter having layers of non-woven filtration media according to the present invention.

Referring now to FIGS. 1 and 2, the electric fuel pump module 14 also includes a depending, preferably hollow cylindrical suction or inlet fitting 26 which defines an inlet opening in fluid communication with the suction side of the fuel pump 20. The cylindrical inlet fitting 26 receives and retains an in-tank fuel filter assembly 30 according to the present invention.

The in-tank fuel filter assembly 30 includes a body 32 comprising a preferably folded swatch of a multi-layered or composite filtration media having a single elongate fold line 34 and a partial peripheral seam or seal 36. The body 32 is preferably rectangular and may be formed of a single, folded swatch of composite filtration media and three of the edges may include an edge or peripheral seam or seal 36. Alternatively, the body 32 may define a triangular, other polygonal shape (e.g., square, pentagonal or hexagonal) or irregular shape with at least one straight edge, in which case one edge is folded and the N–1 remaining edges, where N is the number of edges, or non-folded regions are closed by a seam or seal 36. As a further alternative, the body 32 may comprise a pair of equal size filtration media swatches of any convenient or desired regular shape such as round or oval or irregular shape which may be sealed together entirely around their aligned, adjacent peripheries. In any case, the body 32 forms a closed interior space and includes a first or upper composite panel 38A and a second or lower composite panel 38B.

Generally centrally disposed on the first or upper composite panel 38A of the fuel filter assembly 30 is an outlet fitting 40 which is preferably circular and includes a spring metal mounting and retaining washer 42. The mounting and retaining washer 42 removably or semi-permanently secures the fuel filter assembly 30 to the inlet fitting 26 of the fuel pump 20. Alternatively, spring clips, mounting ears or retaining tabs formed on the outlet fitting 40 may be utilized to secure the fuel filter 30 to the fuel pump 20.

The outlet fitting 40 is preferably fabricated of nylon or other fuel impervious material such as acetal or polyester and is preferably molded in-situ on the upper surface of the fuel filter assembly 30. The outlet fitting may also be assembled from two or more interengageable parts. Also preferably molded in-situ to the second or lower composite panel 38B of the fuel filter assembly 30 are one or more runners, ribs or separators 44 having sufficient internal height above the interior upper surface of the lower panel 38B to maintain separation of the interior surfaces of the upper and lower panels 38A and 38B of the filter assembly 30 in order to facilitate flow therebetween and into the outlet fitting 40. Alternatively, of course, the runners, ribs or separators 44 may be in-situ molded on the first or upper composite panel 38A to achieve this separation and facilitate fuel flow. Both the upper and lower composite panels 38A and 38B are calendered, i.e., point bonded, to provide spaced apart regions of connected or coupled filaments evidenced by the compressed regions 48 illustrated in FIGS. 2, 3 and 4.

Figure 3:
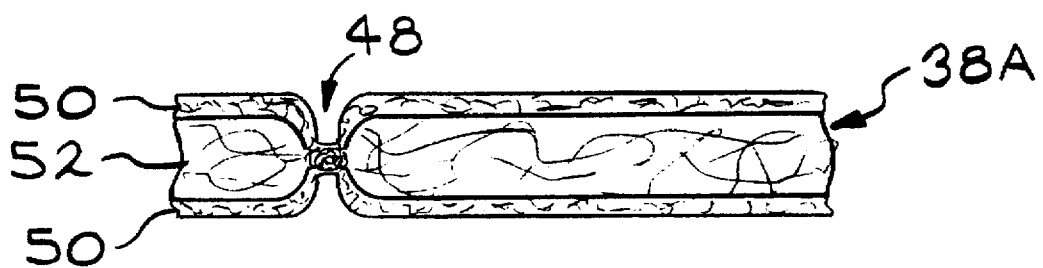
FIG. 3 is a fragmentary enlarged, cross sectional view of the layers of filtration media of one panel of an in-tank fuel filter according to the present invention.

Referring now to FIG. 3, a cross sectional view of the upper panel 38A or lower panel 38B of the filter assembly 30 is illustrated. For purposes of discussion and clarity it will be assumed to be an upper panel 38A, although it should be understood that the panels 38A and 38B are the same, are interchangeable and that the description of one applies equally to the other. The upper composite panel 38A preferably includes at least three distinct layers of non-woven material. The outer, that is, upper and lower exterior regions or layers 50 are preferably spun bonded nylon filaments but may be spun bonded polyester, acetal, Teflon or other stable, fuel tolerant material. Teflon is a registered trademark of the E. I. DuPont de Nemours Co. As utilized herein, the terms spun bonded filaments and spun bonded filtration media refer to that class of non-woven materials wherein the filaments are cooled by the application of cold air immediately upon forming to stop attenuation thereof.

Typically, the diameters of such filaments will be on the order of 100 microns but may readily range from between 50 and 200 microns. Each outer layer 50 illustrated in FIG. 3 has a nominal uncompressed thickness on the order of 0.5 millimeters though such thickness may vary from less than about 0.25 millimeters to up to about 1 millimeter or thicker depending upon production and application variables.

Disposed within the exterior two layers 50 of spun bonded material is a center or intermediate layer 52 of finer, melt blown filaments. As utilized herein, the terms melt blown filaments and melt blown filtration media refer to that class of non-woven materials wherein the filaments are maintained at an elevated temperature by the application of hot air immediately upon forming to encourage attenuation thereof. Typically, melt blown filaments are on the order of ten times smaller than spun bonded filaments and thus are nominally 10 microns in diameter and may readily be in the range of 5 to 20 microns. The melt blown filaments may also be nylon, polyester, acetal, Teflon or other stable, fuel impervious material. The center or intermediate layer 52 of melt blown filaments has a nominal uncompressed thickness of 1 millimeter but may vary from less than 0.5 millimeters to 2 millimeters or thicker.

The upper and lower panels 38A and 38B of the preferred embodiment fuel filter assembly 30 thus include outer or exterior layers 50 of spun bonded material having a first, larger filament size and an intermediate layer 52 of melt blown filaments having filament sizes which are approximately one magnitude smaller. The interstitial or pore size of the layers 50 and 52 are correspondingly larger and smaller. This graduated pore size has the effect of first filtering out larger particulate matter in the exterior or outer layer 50 of spun bonded material and then filtering out smaller particulate matter in the center or intermediate layer 52 of melt blown filaments. This staged or graduated arrangement of filtration filaments and pore sizes is referred to as depth media and the graduated or staged filtration of particulate matter therethrough is referred to as depth media filtration.

The primary benefit of this structure and filtration mode is improved service life in that only particulate matter above a certain size is filtered out by the first filtration material, for example, the exterior layers 50 of spun bonded material, which allow the passage of smaller particulate matter which are then trapped by the smaller pore size of the intermediate layer 52 of melt blown material. Such staged or depth media filtration has the effect of increasing the surface area of the filter as a given region and thus surface area functions to filter only a specific band or range of particulate sizes. This greatly increases the capacity of the fuel filter 30 to retain particulate matter. The exterior layers 50 of spun bonded material also provide excellent abrasion resistance which is necessary in applications where the filter assembly 30 is disposed in contact with a surface, for example, the bottom surface of the fuel tank 10. Moreover, the two exterior layers 50 of spun bonded material fully encapsulate and contain the finer filaments of the intermediate layer 52 of melt blown material thereby preventing migration of the melt blown filaments into the fuel and fuel system of the vehicle.

Figure 4:
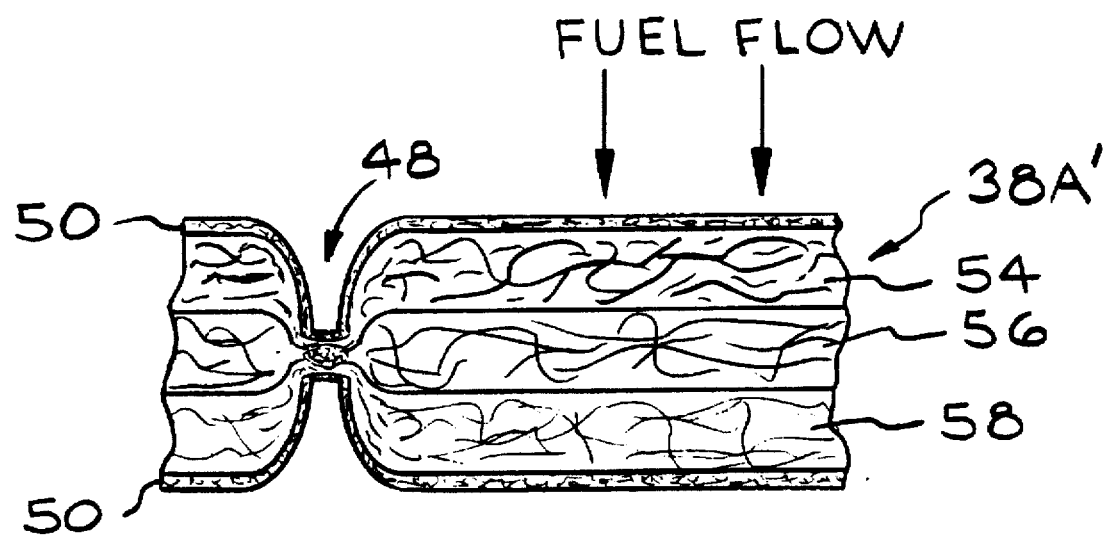
FIG. 4 is a fragmentary, enlarged, cross sectional view of the layers of filtration media of one panel of an alternate embodiment in-tank fuel filter according to the present invention.

Referring now to FIG. 4, a first alternate embodiment panel 38A' of filtration media is illustrated. The first alternate embodiment panel 38A' is similar to the preferred embodiment panel 38A inasmuch as both comprehend a composite, sandwich or stack of a plurality of diverse layers. It will be appreciated that a filter body 32 according to the alternate embodiment will include a first or upper panel 38A' and a second or lower panel, notwithstanding the fact that only a first or upper panel 38A' is illustrated and described herein. Specifically, the alternate embodiment panel 38A' includes exterior or outer, that is, upper and lower layers 50 of spun bonded filtration media which in all respects is identical to the outer layers 50 of the preferred embodiment first or second panels 38A and 38B. Thus, again, the outer layers 50 of spun bonded filtration media define an outer protective cover which encapsulates the finer, melt blown filaments thereby preventing migration of such filaments into the fuel, provides abrasion resistance to the filter body 32 and provides relatively coarse filtration capability.

In FIG. 4, the fuel flow through the alternate embodiment panel 38A', as indicated, is from top to bottom and thus the upper, outer layer 50 of spun bonded filtration media represents the exterior of the filter body 32 whereas the lower spun bonded filtration media layer 50 is disposed at the interior of the filter body 32. Between these two layers 50 of spun bonded filtration media are a plurality of intermediate melt blown layers. A first intermediate layer 54 of melt blown filtration media is disposed adjacent the upper, outer spun bonded filtration media layer 50 and preferably comprises filaments having a nominal diameter greater than 10 microns and preferably in the range of about 10 to 25 microns. Adjacent the first intermediate layer 54 is a second intermediate layer 56 of melt blown filtration media having a nominal filament size of about 10 microns and preferably in the range of about 5 to 15 microns. Adjacent the second intermediate layer 56 is a third intermediate layer 58 of melt blown filtration media having a nominal filament size of less than 10 microns and preferably in the range of about 1 to 5 microns. It should be appreciated that the filament sizes recited are by way of example and illustration only and are not intended to be limiting. However, the graduation of filament sizes from larger to smaller in the direction of fuel flow is significant as this, once again, achieves the staged or depth media filtration action of the invention. It should also be appreciated that a relatively continuous change of filament size with depth, rather than distinct regions of uniform filaments, is also contemplated by the inventors and thus within the scope of this invention.

This configuration of graduated filament size provides excellent depth media filtration, wherein the fuel is subjected to finer and finer filament size and thus smaller and smaller pore (interstitial) size. Thus, staged or depth related removal of smaller and smaller particulate matter from the fuel is achieved. As noted above, such staged or depth media filtration greatly improves the particulate retention capacity of the fuel filter 30 and the service life of such filters inasmuch as each region or layer of depth media or graduated filtration material is exposed to increasingly smaller particulate sizes and only traps particulates of a size relating to the filament and pore (interstitial) size, larger particulates having been trapped by previous larger filaments and pore (interstitial) sizes and smaller particulates and contaminants traveling through to be trapped by subsequent finer filaments and smaller pore (interstitial) sizes.

The foregoing disclosure is the best mode devised by the inventors for practicing this invention. It is apparent, however, that filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An in-tank fuel filter assembly comprising, in combination, a filter body having first and second panels of filtration media defining an edge, a peripheral seal along at least a portion of said edge, said peripheral seal providing a closed interior space between said first and said second panels of filtration media, said first and said second panels of filtration media comprising a pair of outer layers of spun bonded filtration media and an inner layer of melt blown filtration media disposed between said outer layers of spun bonded filtration media, and a fitting secured to said first panel of filtration media for providing fluid communication with said closed interior space.

2. The in-tank fuel filter of claim 1 wherein said filter body is a folded swatch of a filtration media defining said first and second panels of filtration media.

3. The in-tank fuel filter of claim 1 wherein said filtration media is nylon, polyester, acetal or Teflon.

4. The in-tank fuel filter of claim 1 wherein said spun bonded filtration media comprises filaments having diameters in the range of 50 to 200 microns and said melt blown filtration media comprises filaments having diameters in the range of 5 to 20 microns.

5. The in-tank fuel filter of claim 1 wherein said inner layer of melt blown media is fully contained within said spun bonded media thereby preventing migration of said outer layer of melt blown media.

6. The in-tank fuel filter of claim 1 wherein said fitting includes a resilient ring for semi-permanently securing said filter to a fuel inlet fitting.

7. The in-tank fuel filter of claim 1 wherein said first and second layers of filtration media are calendered.

8. The in-tank fuel filter of claim 1 wherein said inner layer of melt blown filtration media includes at least three layers of melt blown filtration media each having distinct filament diameters.

9. A depth media fuel filter assembly comprising, in combination, a closed body of filtration media having an interior and an exterior, said closed body having a first composite panel of filtration media and a second composite panel of filtration media, each of said composite panels of filtration media comprising at least a pair of outer layers of spun bonded material and at least one inner layer of melt blown material disposed between said outer layers of spun bonded material, and an opening in said body for providing fluid communication with the interior of said body.

10. The depth media fuel filter assembly of claim 9 wherein said closed body includes a folded edge and at least two sealed edges.

11. The depth media fuel filter assembly of claim 9 wherein said layers of filtration media are calendered.

12. The depth media fuel filter assembly of claim 9 further including a mounting fitting secured to said filter body about said opening.

13. The depth media fuel filter assembly of claim 12 wherein said mounting fitting include a spring retainer for removably securing said filter assembly to an inlet fitting.

14. The depth media fuel filter assembly of claim 9 wherein said spun bonded material has a filament size of about 100 microns and said melt blown material has a filament size of about 10 microns.

15. The depth media fuel filter assembly of claim 9 wherein said spun bonded material and said melt blown material is selected from the group consisting of nylon, polyester, acetal, and Teflon.

16. The depth media fuel filter assembly of claim 9 wherein said at least one inner layer of melt blown material comprises at least three layers of melt blown material having distinct filament sizes.

17. A in-tank fuel filter assembly comprising, in combination, a closed body of filtration media having an interior and an exterior, said closed body having a first panel of filtration media and a second panel of filtration media, each of said panels of filtration media comprising a sandwich of at least a pair of outer regions of spun bonded filtration material and at least one middle region of melt blown filtration material disposed between said pair of outer regions of spun bonded material, an opening in said body for providing fluid communication with the interior of said body, and a fitting secured to said body about said opening for securing said filter assembly to an inlet fitting, whereby said spun bonded material provides abrasion resistance and contains said melt blown material.

18. The depth media fuel filter assembly of claim 17 wherein said closed body includes a folded edge and at least two sealed edges.

19. The depth media fuel filter assembly of claim 17 wherein said middle region comprises at least three layers of melt blown material having distinct filament sizes.

20. The in-tank fuel filter of claim 17 wherein said spun bonded filtration material comprises filaments having diameters in the range of 50 to 200 microns and said melt blown filtration material comprises filaments having diameters in the range of 5 to 20 microns.

21. The depth media fuel filter assembly of claim 17 wherein said spun bonded filtration material has a filament size of about 100 microns and said melt blown filtration material has a filament size of about 10 microns.

* * * * *